E. D. HARE.
NUT LOCK.
APPLICATION FILED JUNE 27, 1921.
1,404,023. Patented Jan. 17, 1922.
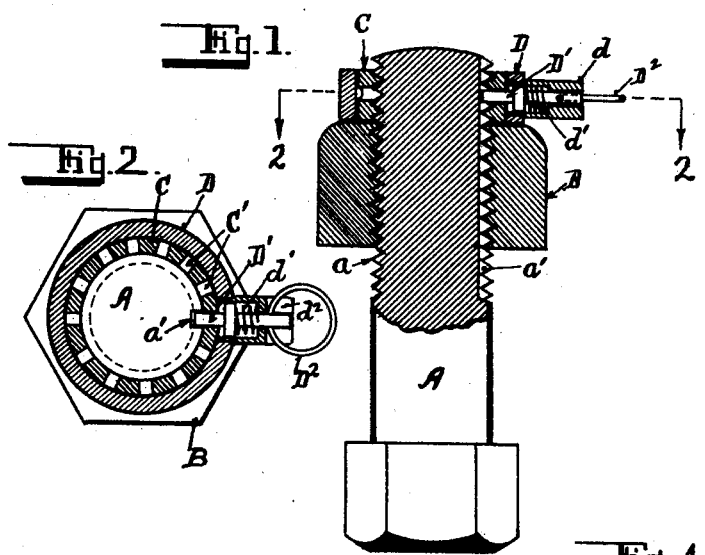
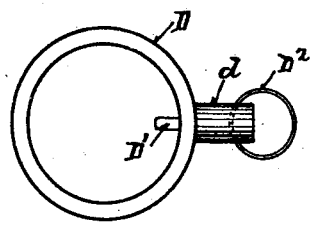
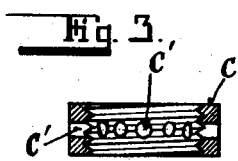
Inventor.
Edward D. Hare
By J C & H M Sturgeon
attys

UNITED STATES PATENT OFFICE.

EDWARD D. HARE, OF ERIE, PENNSYLVANIA.

NUT LOCK.

1,404,023.

Specification of Letters Patent.  Patented Jan. 17, 1922.

Application filed June 27, 1921.  Serial No. 480,737.

*To all whom it may concern:*

Be it known that I, EDWARD D. HARE, a citizen of the United States, residing at Erie, in the county of Erie and State of Pennsylvania, have invented certain new and useful Improvements in Nut Locks; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to nut-locks, the object thereof being to provide mechanism which can be screwed down upon the threads of the bolt against the nut to prevent the nut from becoming unscrewed.

The features of my invention are hereinafter particularly described and pointed out and are illustrated in the accompanying drawings in which:—

Figure 1, is a view in elevation of a bolt, with a portion thereof broken away, showing the nut and nut-locking mechanism thereof in transverse vertical section.

Figure 2, is a transverse section on the line 2—2 in Fig. 1.

Figure 3, is a transverse vertical section of a part of my locking mechanism.

Figure 4, is a plan view of another part thereof.

In these drawings A indicates a bolt having threads $a$ on a portion thereof. In preparing the bolt for my improved nut-locking mechanism I provide a longitudinal slot or groove $a'$ which is cut transversely of the threads $a$. B indicates a nut screwed upon the threads $a$ of the bolt. C indicates an internally screw threaded ring adapted to be placed upon the part of the bolt A which projects through the nut B. This ring C (see Figs. 2 and 3) is also provided with radial holes $C'$ through the wall thereof. Surrounding the ring C is another ring D which is provided with a spring pressed bolt $D'$. This bolt $D'$ is slidably mounted in a short sleeve $d$, which is radially secured in the ring D, and within the sleeve $d$ is placed a spring $d'$ adapted to maintain the bolt $D'$ in the position thereof shown in the drawings. The sleeve $d$ is also provided with a slot $d^2$ through which a ring $D^2$ is placed; said ring also passing through a transverse hole in the bolt $D'$; said ring $D^2$ being for the purpose of pulling the bolt $D'$ backward out of a hole $C'$ in the internally screw threaded ring C.

In operation the nut B is placed upon the bolt A and screwed down upon the threads $a$ of the bolt A, and the ring D is then placed around the ring C, the spring pressed bolt $D'$ being drawn backward so as to allow the ring D to slip over the ring C.

The ring D is turned backward on the ring C until the spring pressed bolt D enters one of the radial holes $C'$ in the ring C, and then by turning the ring D, the bolt $D'$ moves the ring C in unison therewith until the spring pressed bolt $D'$ snaps into the longitudinal slot $a'$. This operation of the spring pressed bolt $D'$, and rings C and D can be repeated until the ring C is screwed firmly down upon the nut B, leaving the spring pressed bolt $D'$ projecting into the slot $a'$ in the bolt A.

Having thus shown and described my invention so as to enable others to utilize the same what I claim as new and desire to secure by Letters Patent is:—

In a device of the class described, a screw-threaded bolt having a longitudinal slot in the periphery thereof, a nut secured upon said bolt, an internally screw-threaded ring having radial holes therein engaging the bolt threads, a ring rotatably mounted on said screw-threaded ring, a spring-pressed locking-bolt radially mounted in said ring and adapted to extend inwardly through a hole in said screw-ring and into the longitudinal slot in said bolt.

In testimony whereof I affix my signature.

EDWARD D. HARE.